Jan. 25, 1955  R. B. EVANS ET AL  2,700,412
TROOPSHIP TYPE AIRPLANE SEAT STRUCTURE
Original Filed Sept. 15, 1944  4 Sheets-Sheet 1

INVENTORS.
Robert B. Evans,
Sulo M. Nampa.
BY
Harness, Dickey & Pierce
ATTORNEYS.

Jan. 25, 1955   R. B. EVANS ET AL   2,700,412
TROOPSHIP TYPE AIRPLANE SEAT STRUCTURE
Original Filed Sept. 15, 1944   4 Sheets-Sheet 2

INVENTORS.
Robert B. Evans,
Sulo M. Nampa.
BY
Harness, Dickey & Pierce.
ATTORNEYS.

Jan. 25, 1955  R. B. EVANS ET AL  2,700,412
TROOPSHIP TYPE AIRPLANE SEAT STRUCTURE
Original Filed Sept. 15, 1944  4 Sheets-Sheet 3

INVENTORS
Robert B. Evans,
Suto M. Nampa.
BY
Harness, Dickey & Pierce
ATTORNEYS.

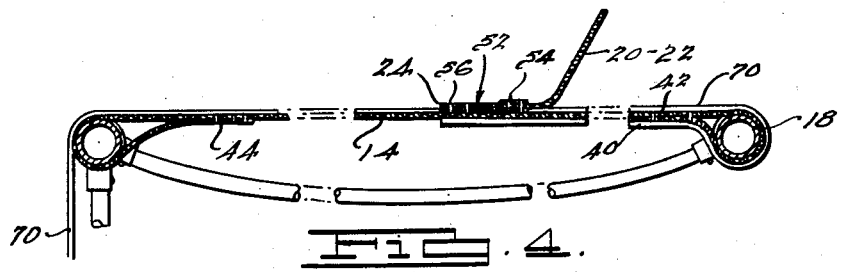
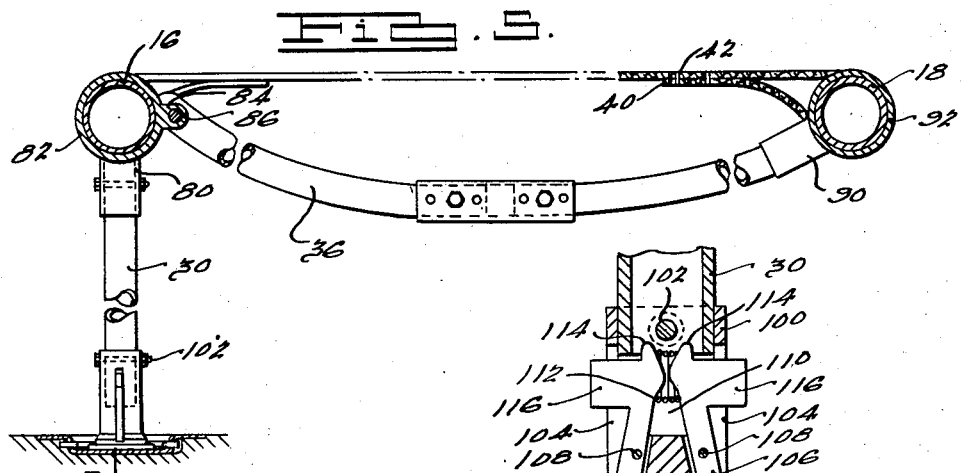
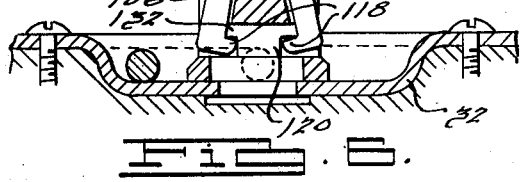
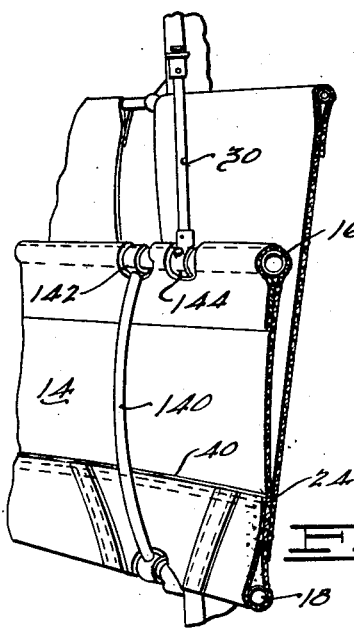
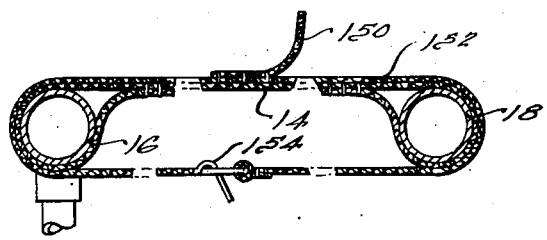

United States Patent Office 2,700,412
Patented Jan. 25, 1955

2,700,412

TROOPSHIP TYPE AIRPLANE SEAT STRUCTURE

Robert B. Evans, Grosse Pointe Shores, and Sulo Michael Nampa, Detroit, Mich., assignors to Evans Products Company, Plymouth, Mich., a corporation of Delaware Original application September 15, 1944, Serial No. 554,203, now Patent No. 2,556,076. Divided and this application May 1, 1951, Serial No. 223,976

4 Claims. (Cl. 155—5)

The present invention relates to seat structures and is particularly directed to the provision of improved seat structures having flexible back and seat portions and being readily foldable and removable and constructions which can be convertibly used as beds, bunks, or litters and as multiple seats. The present application is a division of the inventors' copending application, Serial No. 554,203, filed September 15, 1944, now Patent No. 2,556,076.

Principal objects of the invention are to provide constructions of the above type, which are extremely simple in construction, economical of manufacture and assembly, and light in weight, which are readily convertible as aforesaid and which may be readily installed in and removed from associated structures, such for example as transport aircraft; to provide such constructions which, when utilized as a bed, afford a surface of desirable width and which, when utilized as a seat, provide a seat of desirably less depth; to provide such constructions which define a longitudinally extending bed surface, having spaced side rails and which further define a plurality of seat backs which extend upwardly from the bed surface in the region adjacent one of the rails; to provide such constructions in which the seat backs are secured to the seat surface at points between the aforesaid rails, whereby to afford the aforesaid difference between the effective width of the structure as a bed and the effective depth of each of the seats afforded by the structure; to provide such constructions wherein the seat backs can conveniently be released from associated upper supports and be folded down, in converting the structure to a bed; to provide such constructions wherein each seat back is of sufficient height to support the head as well as the back of the occupant; to provide such constructions in which the upper ends of the backs are supported by a rail common thereto, said back rail and one of the aforesaid seat rails being removably secured to the supporting structure, and the remaining seat rail being provided with legs which are detachably engageable with the floor of the associated structure; to provide such constructions in which the seat can be folded up against the backs and in which the legs are adjustable relative to the associated front rail so that they do not protrude when the seat is folded; to provide such structures in which the spacing between the aforesaid side rails is maintained by spreaders of improved construction; to provide such constructions employing safety belts of the general type used in aircraft practice, but having an improved connection to the seat structure; and to generally improve and simplify the construction and arrangement of structures of the above type.

With the above as well as other and in certain cases more detailed objects in view, preferred but illustrative embodiments of the invention are shown in the accompanying drawings, throughout the several views of which corresponding reference characters are used to designate corresponding parts, and in which:

Fig. 4 is a fragmentary view in horizontal transverse section, of the seat structure of Fig. 1;

Fig. 5 is a fragmentary view illustrating details of the leg structures;

Fig. 6 is an enlarged sectional view showing a releasable connection between a leg structure and a floor fitting;

Fig. 7 is a fragmentary view in perspective of a modified embodiment of the invention; and Fig. 8 is a fragmentary view of a further modification of the invention.

It will be appreciated from a complete understanding of the present invention that, in the broader aspects, the improvements thereof may be utilized in widely differing seat and/or bed constructions and/or convertible constructions, intended for widely differing types of service and/or association with widely differing structures. Further, in a generic sense, certain of the present improvements can be utilized independently of others of such improvements.

A preferred but illustrative application of the invention, is in providing convertible seat and bed structures for use in aircraft of the transport type; and more particularly in those instances where it is desired that the seat and bed structures shall be readily removable from and installable in the airplane structure, as well as being foldable or otherwise collapsible so that, when not in use, the structures do not interfere with the otherwise usable cargo space. The present application discloses such an application of the invention, in an illustrative but not in a limiting sense.

Figures 1, 1A:
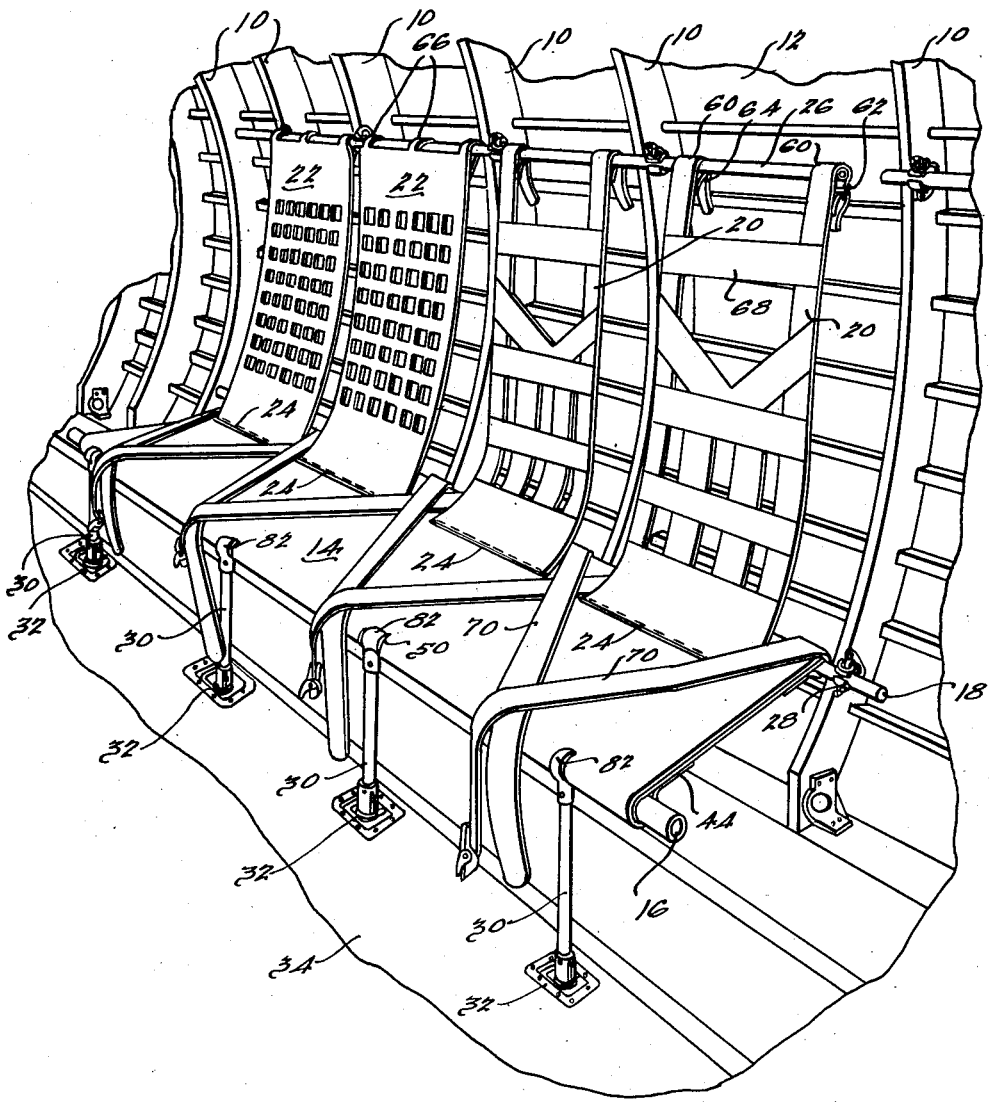
Figure 1 is a view in perspective of an embodiment of the invention.
Fig. 1A is a fragmentary view of a variant of Fig. 1.
Figure 2:
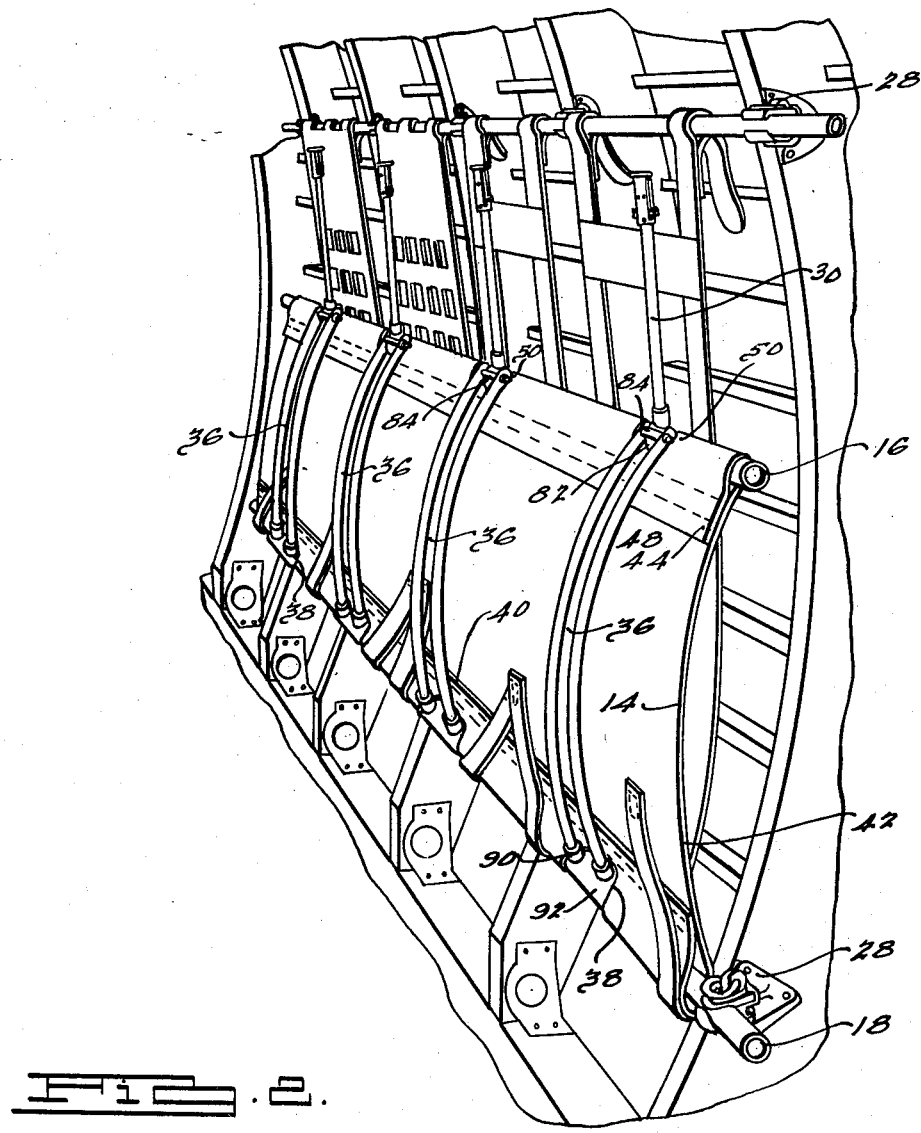
Fig. 2 is a perspective view, showing the structure of Fig. 1 in the folded position.

Referring first to Figs. 1 and 2, the improved seat and bed structure is illustrated as being arranged along one side of an associated airplane, the usual structural and fuselage surface elements of which are designated respectively as 10 and 12. The improved structure comprises generally a seat or bed surface 14, which is suspended between laterally spaced parallel side rails 16 and 18, and which is of sufficient width and length to readily and comfortably accommodate an occupant in lying position lengthwise thereof. In addition, the structure defines a plurality of individual backs 20 and 22, the lower end of each back being secured to the seat surface 14 as indicated at 24 and the upper end of each back being detachably secured to a back rail 26. As shown, rails 18 and 26 are removably secured to the ribs 10 by adjustable clamps 28. Clamps 28 are rigidly secured to the ribs 10 and may and preferably do take the particular form described and claimed in the copending application, Serial No. 554,204, filed September 15, 1944, by the present applicants and Milton Fetterly. On the other hand, as shown, the front rail 16 is supported by a plurality of legs 30, the upper ends whereof are pivotally connected to the rail 16 and the lower ends whereof are detachably engageable with fittings 32 which are attached to the floor 34 of the associated plane. As will be understood, these fittings 32 may also serve as cargo anchor points.

Considering the above generally indicated elements in greater detail, the seat 14 may in the broader aspects of the invention be formed of any of a wide variety of material. Preferably, seat 14 is formed of a durable flexible material such as canvas. To enable the use of such material, spreaders 36 are connected between the side rails 16 and 18 at a plurality of points spaced lengthwise of the structure. As shown, the rear edge of the seat 14 is folded around the side rail 18, being provided with cutouts 38 to accommodate the spreaders, and the marginal edge 40 of the surface 14 being secured to such surface at a point spaced outwardly from the rail 18 by a substantial amount, for a purpose mentioned below. The connection between the marginal edge 40 and the body of the seat surface 14 may be and preferably is completed by stitching as indicated at 42.

Also as shown, the surface 14 is connected to the rail 16 looping the material therearound and stitching as indicated at 44. As is also indicated, the connection to the rail 16 is interrupted at a plurality of points 50 to accommodate the legs 10 and the corresponding ends of the spreaders 36.

As in the case of the seat surface 14, the backs 20 and 22 may be formed of various materials, a flexible but sturdy material such as canvas being preferred. In the broader aspects, the backs may be either continuous or meshlike, meshlike constructions being preferred and two such meshed formations being illustrated by the respective backs 20 and 22.

An important feature of the invention resides in making the previously mentioned connection 24 between the lower ends of the backs 20 and 22 and the seat surface 14 at a point which falls between the rails 16 and 18. This feature provides seat surface, of a depth, measured from the rail 16 which is suitable for seat purposes. Such a depth, as will be understood, is undesirably narrow for bed purposes. With the present construction, however, in which the upper ends of the backs 20 and 22 are detachably connected to the rail 26, these backs may be dropped down behind the seat surface 14, thereby affording a bed surface having a width equal to the full spacing between the rails 16 and 18. Preferably and as shown in Fig. 4, the lower edge of each back is provided with an attaching tab 52, of double thickness, and stitched through as indicated at 54. The attaching tab 52 in turn is stitched as indicated at 56, to the seat surface 14.

The upper end of each back 20—22 may be detachably connected to the rail 26 in various ways. As shown, the backs 20 are provided with side strips 60 which are turned over the rail 26 and which may be secured as by a buckle 62 to corresponding short strips 64. This buckled connection enables adjustment of the amount of slack in each back 20 as will be understood, and also permits ready disconnection of each such back from the rail 26. Backs 22 may be similarly secured to the rail 26, and are illustrated as having three such connecting strips 66.

An important feature of the invention resides in giving the backs 20—22 sufficient height so that the head of the occupant is supported thereby. In the case of backs such as 22, the occupant's head may engage either the meshed or the continuous portions thereof. In the case of backs 20, head support is afforded by the upper cross strips 68.

An important but not always essential feature of the construction resides in proportioning the widths of the respective backs so that they register with the bays defined by the successive fuselage ribs 10. With such proportioning, such ribs are prevented from interfering with free flexing of the backs when in use.

In accordance with usual aircraft practice, the present structure is preferably provided with safety belts 70. An important feature of the construction resides in securing the rear ends of these belts to the seat structure in such a way as to achieve a snubbing effect. More particularly, as is shown in Fig. 4, each safety belt portion 70 is turned around the rail 18, and its end is sewed to the seat surface 14. As indicated, this connection may be effected by the previously mentioned stitching 56.

As will be best appreciated by consideration of Figs. 1 and 4, the safety belts 70 contribute to the improved operation of the present seat construction. When the safety belts are in use, i. e., buckled around the body of a person seated on surface 14, they are placed in tension and they tend to move with the person's body. There is friction between the belts 70 and the loops of the seat 14 which pass over the rear rail 18. This friction acts as a shock absorber to check impact loads on both the belts and its stitches as well as on the seat 14. It will be seen that tension in the belts 70 is transmitted to the seat through the stitches 56 and that it acts in opposition to tension in the seat which results from the weight of the person sitting on it. The safety belts 70 therefore create a spring effect tending to yieldably raise the body of the person sitting on the seat 14 and thus add to the comfort of the unit. In view of their connection to the seat 14, the belts 70 take some of the load applied to the seat and when they are secured at joint 52 it will be seen that to this extent they relieve load on the short sections of the seat 14 between the back sections 20 and 22 and the rear rail 18.

As illustrated, the upper ends of the legs 30, which may be and preferably are formed of tubular stock, are provided with fittings 80, which define short sleevelike portions 82, within which the rail 16 is received, the indicated construction being one in which rail 16 is freely rotatable within each such sleeve 82. In the construction now being described, the respective sleeves 82 are provided with inwardly projecting bosses 84 which provide bearings to receive pins 86 by which the corresponding ends of the spreaders 36 are connected to the rail 16. The individual spreader legs 36 straddle the bosses 84.

The other ends of the spreaders 36 are provided with fittings 90, which define sleeve-like portions 92, within which the rail 18 is freely rotatable.

It will be noticed that the spreaders 36 are illustrated as being of double construction, although the single construction of Fig. 7 may also be utilized. A particular feature of the invention resides in giving the spreaders 36 a downwardly bowed character, so that they do not interfere with free flexing of the surface 14 when used as a bed. If, as is indicated in Fig. 1A, and spreaders 37 are utilized, such spreaders may also serve as caps for the rails 16—18. Such end spreaders may be either bowed or straight.

In the present embodiment, the lower ends of the legs 30 are provided with fittings 100, detachably secured thereto by through bolts 102. The body of each fitting, which may be formed, for example, as a die casting, defines vertically extending diametrically opposite slots 104, within which latches 106 are pivotally secured by pins 108. Adjacent the upper ends, the slots 104 are joined by an enlarged chamber 110, the upper end whereof receives the leg 30. Chamber 110 also receives a compression spring 112 which acts between the latches 106 and urges the upper ends thereof apart. A limit to such separating movement is afforded, when the fitting is inactive, by stop portions 114, which are disposed to engage the lower end of the leg 30. Latches 106 are provided with finger portions 116, which may be engaged to press the upper ends thereof, thereby separating the lower and hooked ends 118 sufficiently far to pass over the headed retaining element 120 which is rigidly secured to the base of the depressed floor plate 32. When so engaged the hooked portions 118 lie behind and in latching relation to the annular shoulder 132 provided on the retaining element 120.

Figure 3:
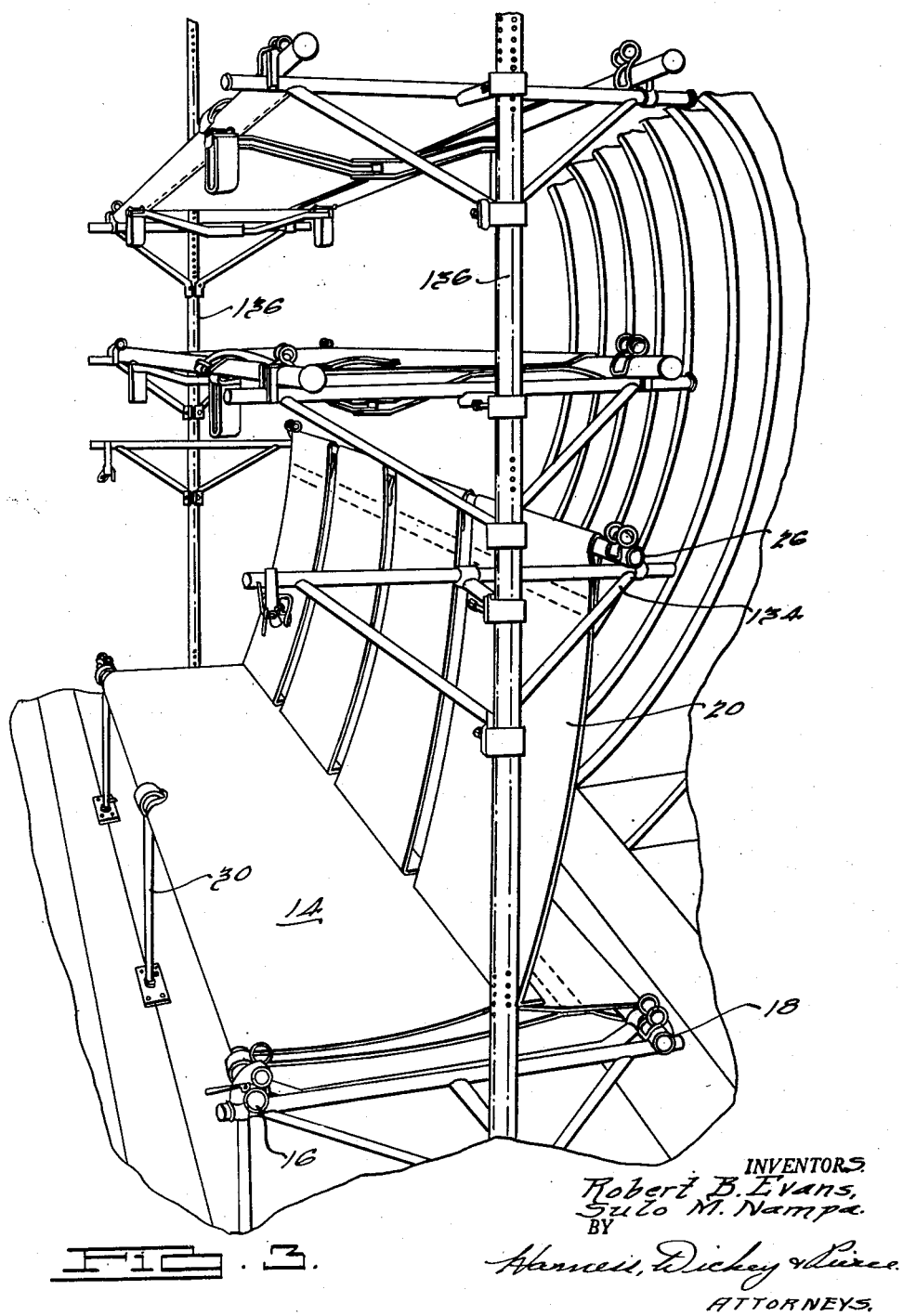
Fig. 3 is a perspective view showing an alternative supporting structure for the structure of Figs. 1 and 2.

The embodiment of Fig. 3 is illustrated as being a duplicate of that of Figs. 1 and 2 with the exception that in this case the rails 18 and 26 are supported, through bracing members 134, by uprights 136. As in the first instance, however, rail 16 is supported by the associated legs 30. As will be understood, Fig. 3 illustrates the adaptability of the present constructions to locations other than those immediately adjacent an associated wall surface.

The embodiment of Fig. 7 may and preferably does duplicate the embodiment of Figs. 1 and 2 with the exception first, that in this instance the spreaders 140 are of single construction and the spreaders 140 and legs 30 are provided with individual connections afforded by sleeves 142 and 144, to the rail 16. The use of individual connections is advantageous for many reasons. For example, it enables an adjustment of the seat tension in the manner described and claimed in the aforesaid copending application. In addition, it enables a spacing between the legs which differs from that between the spreaders. Such different spacing may be needed, for example, to accommodate the seat structure to the locations of the floor fittings 32. In Fig. 7, also, the marginal edge 40 is adjacent the junction 24, which affords a somewhat more secure connection of the back to the seat.

The embodiment of Fig. 8 provides an adjustment of the effective depth of each seat. More particularly, in this embodiment, the lower end 150 of each seat back is secured to a loop of material 152 which passes around the seat surface 14. By releasing the buckle 154 loop 152 may be moved to bring the back 150 nearer to or farther from either one of the rails 16 and 18.

In utilizing the aforesaid structures, it will be appreciated that they may readily be applied to and removed from the associated structure and that they may readily be converted for either bed or seat use, and that when not in use they may readily be folded to an out-of-the-way position. With particular reference to Figs. 1 and 2, as an example, it will be appreciated that the seat structure may be removed as a whole simply by releasing the leg fittings 100 from the floor plates 32 and by releasing rails 18 and 26 from their associated wall fittings 28. An installing operation is, of course, just the reverse. To convert the structure for bed purposes, it is only necessary to disconnect the backs from the rail 26 and allow them to fall down behind the surface 14. Again, in folding the structure it is only necessary to release fittings 100 from the floor plates 32, whereupon the seat 14 can be swung upwardly to the position of Fig. 2. Following such swinging, legs 30 may be turned to the out-of-the-way position indicated in Fig. 2. Alternatively, with the construction of Fig. 7, the legs 30 may either be turned to the indicated position or may be dropped down so as to hang vertically downwardly from the rail 16.

Although only several specific embodiments of the invention have been described in detail, it will be appreciated that various modifications in the form, number, and arrangement of the parts may be made without departing from the spirit and scope of the invention.

What is claimed is:

1. In a combined bed and seat structure for detachable connection to associated means having a floor and supporting parts elevated above the floor, said structure comprising laterally spaced elongated front and rear side rails, flexible material extending between and connected to the rails, said material forming an elongated bed surface and a plurality of seat surfaces, a plurality of seat backs each connected at its lower end to said flexible material at a point spaced outwardly from said rear rail, means adapting the upper ends of said backs for releasable connection to certain of said elevated parts, safety belt means having inner ends snubbed around the rear rail and connected to said structure forwardly of said rear rail.

2. For use in an airplane, a seat structure comprising directly connected canvaslike seat and back portions, said back portion including an upper support which in its operative position is connected to suitable means on the upright side wall of the airplane, swingably movable front support means including legs for said seat portion with detachably connectible means to engage and be carried by the airplane floor, said seat portion including a rear support spaced rearwardly from the lower end of said back portion and in its operative position connected to suitable means on said upright side wall of the airplane, and flexible tension connecting means acting between said seat rear support and the rear of said seat portion and the lower connected end of said back portion, whereby said seat portion may be swung up against said airplane side wall with a flexible collapse of said back portion to permit said swinging without disconnecting the said back from its upper support, said seat structure being tensioned by the weight of a seated person, said rear support in its normal operative position including a loop of the canvaslike seat portion around said suitable means on the upright side wall, an elongated flexible strap member adapted to securingly engage the seated person and in its normal operative position being looped around said suitable means to transmit load thereto by belt action and secured to the undersurface of said canvaslike seat portion to also transmit directly load thereto adjacent to its said connection to said back portion.

3. A fold up, lightweight airplane seat structure comprising, a seat surface member extending horizontally in its operative position having leg means foldably connected thereto adjacent its front edge and having pivotal securing means located adjacent its rear edge for connection to said airplane wall structure to permit upward swinging of said surface from said operative position to lie adjacent said airplane side wall, a back extending upwardly from and supporting said seat surface member at a location intermediate its front and rear edges, and having securing means adjacent its upper end to connect to said airplane wall structure, said back being entirely flexible to permit collapse thereof upon upward swinging of said seating surface to fold up said seat structure, a front rail, said seat surface member being of flexible sheetlike material having front and rear loops, said front loop embracing the front rail and said rear loop comprising said pivotal securing means and in its operative position embracing a suitable rear rail on the side wall, said seat structure also including spacers extending between and connected to said front rail and pivotally connected to said suitable rear rail to permit said seat surface member together with said spacers to swing up about said suitable rear rail, and flexible elongated straplike members secured directly to the underside of said flexible seat surface member and embracing in their normal operative position the said suitable rear rail in a loop to transmit some load thereto and thence to the airplane side wall structure.

4. In a collapsible light weight seat structure adapted to be secured to suitable means along the inner upright sidewall of a vehicle, the combination of a flexible sheetlike means providing a seating surface, front support means connected to and supporting the front edge of said sheetlike means, the rear of said sheetlike means having swingable connecting means for connection to said suitable means to permit swinging of the seat structure about said suitable means, and flexible safety belts secured to the underside of said sheetlike means forward of and passing around said swingable connecting means and adapted to embrace a person seated on the topside of said sheetlike means.

References Cited in the file of this patent

UNITED STATES PATENTS

| 2,033,779 | Monk | Mar. 10, 1936 |
| 2,391,051 | Windsor | Dec. 18, 1945 |
| 2,394,523 | Pancoe | Feb. 5, 1946 |

FOREIGN PATENTS

| 16,293 | Australia | Oct. 18, 1928 |
| 610,584 | Germany | Mar. 13, 1935 |